United States Patent [19]

Larson et al.

[11] Patent Number: 5,708,782
[45] Date of Patent: Jan. 13, 1998

[54] METHOD AND APPARATUS FOR DISPENSING DISCOUNT COUPONS

[76] Inventors: Blaine Larson, P.O. Box 3236, Morgan City, La. 70381; Juan Lopez, 1110 Ditch Ave., Morgan City, La. 70380

[21] Appl. No.: 348,713

[22] Filed: Dec. 2, 1994

Related U.S. Application Data

[63] Continuation-in-part of Ser. No. 35,220, Mar. 22, 1993, abandoned.

[51] Int. Cl.$^6$ .............................. G06F 17/60; G06G 7/52
[52] U.S. Cl. ........................ 395/214; 194/211; 395/226; 395/227
[58] Field of Search ............... 364/401 R, 405, 364/406, 479; 194/205, 211; 235/375, 376, 380, 381, 382, 383; 340/825.31, 825.34, 825.35; 395/201, 214, 213, 228, 229, 226, 227

[56] References Cited

U.S. PATENT DOCUMENTS

| | | | |
|---|---|---|---|
| 3,387,455 | 6/1968 | Hurt | 194/211 |
| 4,470,495 | 9/1984 | Unger | 194/205 |
| 4,518,073 | 5/1985 | Pastien | 194/205 |
| 4,587,651 | 5/1986 | Nelson et al. | 370/85.12 |
| 4,636,950 | 1/1987 | Caswell et al. | 364/403 |
| 4,639,914 | 1/1987 | Winters | 370/110.1 |
| 4,723,212 | 2/1988 | Mindrum et al. | 364/401 R |
| 4,882,675 | 11/1989 | Nichtberger et al. | 364/401 R |
| 4,887,260 | 12/1989 | Carden et al. | 370/60 |
| 4,908,761 | 3/1990 | Tai | 364/401 R |
| 4,937,586 | 6/1990 | Stevens et al. | 343/702 |
| 4,973,952 | 11/1990 | Malec et al. | 340/825.35 |
| 4,982,346 | 1/1991 | Girouard et al. | 364/550 |
| 5,036,535 | 7/1991 | Gechter et al. | 379/210 |
| 5,091,713 | 2/1992 | Horne et al. | 340/541 |
| 5,111,927 | 5/1992 | Schulze, Jr. | 194/209 |
| 5,119,087 | 6/1992 | Lucas | 340/825.35 |

OTHER PUBLICATIONS

Wallach; "In-Store Coupon 'Vending' Units Get 'Em While They're Buying"; *Quick Frozen Foods*; v47; p. 44(2); Jun. 1985; Dialog; File 148, Acc#02335752.

Saunier; "Cincinnati Retailer Uses Ad Hoc networks for Novel Marketing"; *Marketing Computers*; v9 n12; p. 44(1); Dec. 1989; Dialog: File 148, Acc#04159006.

*Primary Examiner*—Gail O. Hayes
*Assistant Examiner*—Stephen R. Tkacs
*Attorney, Agent, or Firm*—Frank A. Lukasik

[57] ABSTRACT

The present invention resides in apparatus, and software, and a related method for selecting, printing, and dispensing a redeemable discount coupon and other offerings in response to the taking of or upon the return of a cart to a electronic coupon dispensing terminals. A computerized kiosk, updated by a remote command center, is located at the entrance of the corral. Customers receive a key at the check out counter to be used to access the dispenser for the selection of discount coupons. As the cart is replaced in the corral, the system is activated and the customer selects from a touch screen monitor and a dispenser prints and issues a manufacturer's coupon. Statistical information is gathered by the computer and relayed to the store CPU. Maintenance requirements are also relayed to the store CPU.

6 Claims, 11 Drawing Sheets

METHOD AND APPARATUS FOR DISPENSING DISCOUNT COUPONS

CROSS-REFERENCE TO RELATED APPLICATION

This application is a continuation-in-part of my prior patent application Ser. No. 08/035,220, filed Mar. 22, 1993, now abandoned, and issued Disclosure Document No. 307,688 on May 4, 1992.

BACKGROUND OF THE INVENTION

1. Field of the Invention

The present invention relates generally to the computerized management of merchandise carts. More particularly, the invention relates to systems capable of the distribution and handling of discount coupons which are employed in association with the management system.

2. Description of the Prior Art

Many stores, especially grocery stores, have a plurality of shopping carts which are used to carry goods purchased from the store by the customers to the customer's vehicles. After the goods or groceries are unloaded from the carts, the customer typically leaves the shopping cart in the parking lot area. One problem created by shoppers who simply leave the shopping carts in the middle of the parking lot is that the store must hire personnel to periodically retrieve its shopping carts from the parking lot and return them to the desired shopping cart area. This results in high labor costs for the store.

Another problem that stores and their suppliers have is the issuance and use of the familiar "cents off" coupon issued by a manufacturer or "in store" coupons issued by the merchants in order to induce a consumer to purchase that manufacturer's product as opposed to a similar product of another manufacturer. Because of its sheer size and the proliferation of duplicative products, coupon usage is greatest in the mass marketed consumer product industry.

At the present time, coupon distribution is limited to in-store delivery, on-product delivery, magazine delivery, newspaper delivery, point of sale, limited electronic distribution, and direct mail. These delivery methods are designed to reach all classes of consumers in the various markets throughout the United States and have been instrumental in the growth and development of the 10,000 familiar brand name products on retail shelves today. Magazine delivery of coupons is relatively expensive and suffers from limited audience reach and flexibility in terms of market selectivity. Newspapers deliver a large number of coupons between daily and Sunday editions. Point of sale coupon distribution is designed to influence consumers who have yet to make a purchasing decision with respect to a particular product. Currently, new technology has made possible the introduction of coupons generated electronically at the point of sales/scan and at the point of buyer's decision, within the aisles of the supermarket. Finally, there is the direct mail delivery of coupons which delivers the second highest market share of the different methods of distribution of coupons but has a relatively high redemption rate because of its targeted delivery.

In spite of the success of direct mail delivery and other methods, 98% of the distributed coupons are never redeemed. Over 310 Billion coupons are distributed each year. With a redemption rate of only 2%, the resulting waste of paper which eventually winds up in landfills is between one and two million tons of paper waste. This paper waste results in a negative impact on the environment by increasing the amount of waste deposited in the landfills and the destruction of an equivalent amount of trees consumed in the paper making process plus the energy required to manufacture the paper and print the coupons.

There have been a number of proposals to solve one or two of the above problems. U.S. Pat. No. 5,119,087 to Lucas discloses a system for retrieving shopping carts at a store having a plurality of shopping carts. The system includes a counter which can be preset to a first determined count. A target is mounted to each shopping cart while a sensor detects the return of each shopping cart to a designated area. As each shopping cart is returned to the designated area, the sensor generates an output pulse which changes the count in the counter. Whenever the count in the counter achieves a second predetermined count, an alarm is activated that a prize is awarded to the person returning the shopping cart to a designated area. The patent to Lucas is one attempt at solving the problem of turning in shopping carts.

U.S. Pat. No. 4,723,212 to Mindrum et al discloses an apparatus and method for creating a discount coupon in response to the purchase of a product other than the one to which the coupon applies. A record pertaining to each item purchased is examined to determine whether the item is intended to trigger the creation of a coupon. If it is, at least one associated coupon deal record is retrieved, and a coupon becomes a candidate for printing, subject to a maximum number of coupons per transaction. The apparatus also validates coupons presented for redemption, scanning a list of purchased products to determine whether any falls into the same product group specified on the coupon, and also determining whether the coupon date is valid.

U.S Pat. No. 4,882,675 to Nichtberger et al discloses a paperless system for distributing, redeeming and clearing merchandise coupons. An electronic display of coupons valid for use in a particular store is presented to customers in that store. When a customer makes a selection of coupons from the display, the selection is recorded. The customer is subsequently identified at a store checkout station as the one who made the selection. In a preferred embodiment, the identification is made by scanning a special card adapted for use with the system. The items purchased in the store by the customer are recorded, and any matches between the coupons selected and the items purchased are determined electronically. The customer is immediately credited in accordance with the terms of the matched coupons. Redeemed coupons are periodically cleared electronically.

U.S. Pat. No. 4,908,761 to Tai discloses a system for identifying heavy product purchasers who regularly use manufacturers' purchase incentives and predicting consumer promotional behavior response patterns. The delivery of the coupons to the selected consumer households would also include at least one and preferably a plurality of consumer activated encoding devices each of which is designed to be attached to a coupon. The encoding device delivered to each consumer includes the name and address of the receiving consumer in machine readable language. Those coupons having the attached encoding devices are received for redemption like other coupons, however, the names and addresses of the consumers submitting the encoded coupons received for redemption are read and recorded and a refined list of consumer names and addresses that actually redeem cents-off coupons is created from the initial prepared list of consumers. The consumer list can then be refined and consumer response can be determined.

U.S. Pat. No. 4,973,952 to Malec et al discloses a shopping cart display system which includes a cart mounted display that is responsive to trigger signals provided by transmitters associated with a particular location. When the display receives a unique trigger signal, it displays advertising media associated with that location. In one embodiment, the display includes a sensor for determining whether the information is displayed in the presence of a consumer, and a memory for storing all trigger signals received during a given shopping trip. The stored data is transmitted to a polling transceiver located at a point of sale register for later analysis.

U.S. Pat. No. 4,937,586 to Stevens et al discloses a low power broadcast system that is used in the so-called "electronic shelf" for retail stores, where the shelf edge carries price displaying modules that can be addressed and controlled from a central computer operated station. The system also permits the modules to broadcast back to the central station to confirm safe receipt of data and to give information as to stock levels, etc. A broadcast system avoids the need for wiring so that location changes are facilitated.

U.S. Pat. No. 4,636,950 to Caswell et al discloses an inventory management system using transponders associated with specific products. The transponders can communicate with computer controllers and automated data processing over standard telephone lines by using typical telemetry or other communications systems.

Ideally, what is needed from a marketing standpoint is some method of putting a discount coupon for a selected product in the hands of a customer who uses some competing product, to build brand loyalty, to introduce a new product, or to introduce other products in the same line. In addition, a method of encouraging customers to return shopping carts to the proper storage area is also needed. The present invention satisfies this need and as an associated extra benefit works to ameliorate a vexing problem facing retail outlets requiring the use of shopping carts and reduces the amount of paper waste.

SUMMARY OF THE INVENTION

The present invention resides in apparatus, and software, and a related method for selecting, printing, and distributing a redeemable discount coupon and other offerings in response to the return of a shopping cart to a corral. Briefly, and in general terms, the apparatus of the invention comprises means for the selection of product coupons and other offerings, the printing of those same coupons, and the distribution of those coupons.

It is therefore an object of the present invention to provide a system and methodology for economically retrieving shopping carts and distributing coupons.

It is a further object of the present invention to provide a system and methodology which issues and tracks the redemption of coupons while providing an incentive for shoppers to return their carts.

The above objects, as well as others which will hereinafter become apparent, are accomplished in accordance with the present invention by providing a system and methodology which initially involves a Computer Command Center (CCC), communicating through a satellite network and/or existing telephone lines, with a store Central Processing Unit (CPU), and RF LAN technology to shopping cart corrals located in a shopping center parking lot. Each corral contains a computer screen which may display a series of promotion coupons. A customer, upon returning a cart, or otherwise having access to the screen, may select the desired coupon from the screen and a coupon is printed out, on-site. In addition, a consumer having a validated key will have access to other electronic coupon dispensing terminals located in the area.

The features and advantages of the invention will be further understood upon consideration of the following description of the preferred embodiment taken in conjunction with the drawings.

DESCRIPTION OF THE PREFERRED EMBODIMENT

The method and apparatus for dispensing discount coupons of the invention is a unique new channel for the electronic distribution of manufacturer's merchandise coupons. The system has been designed to facilitate the management of shopping cart related costs experienced primarily but not exclusively, by the supermarket industry. More specifically, the means for the selection of a coupon is provided to the customer of a retailer who uses and returns a shopping cart to the corral provided for its storage. A computerized kiosk is located at the entrance of the corral. During the operating hours of the retail outlet, the kiosk corral is maintained in a standby status with the security doors open and the kiosk in operation. Customers take their shopping carts from the corral, at which time they receive a coupon with a coded key and proceed to make their purchases.

While the concept of the invention is simple, the necessary infrastructure to properly implement and control a wide-area data distribution and retrieval system in a point-to-multipoint network configuration is quite complex. Two basic needs are provided with the pairing of a cost effective and demographically targeted coupon distribution method for consumer packaged goods manufacturers and effective method of cost containment for retailers in the specific areas of: labor, to retrieve carts; shrinkage, theft and premature obsolescence; and liability, on site and off site. The inventive concept links the two concepts in an effective solution for both: The manufacturers get an alternative cost effective means for the distribution on a targeted basis to the consumer; The lead time required to launch a coupon campaign is much shorter than traditional advertising and enables the manufacturer to counter more rapidly competitor efforts to garner market share.

Another very important feature of the invention is its security. Coupon mis-redemption is a $600–$800 million industry. Short expiration dates, bar coding and other security measures will eliminate these coupons as an attractive target for counterfeiters. In addition, the retailer competes more effectively by lowering significant costs in areas that have eluded management efforts for the past fifty years.

Figure 1:
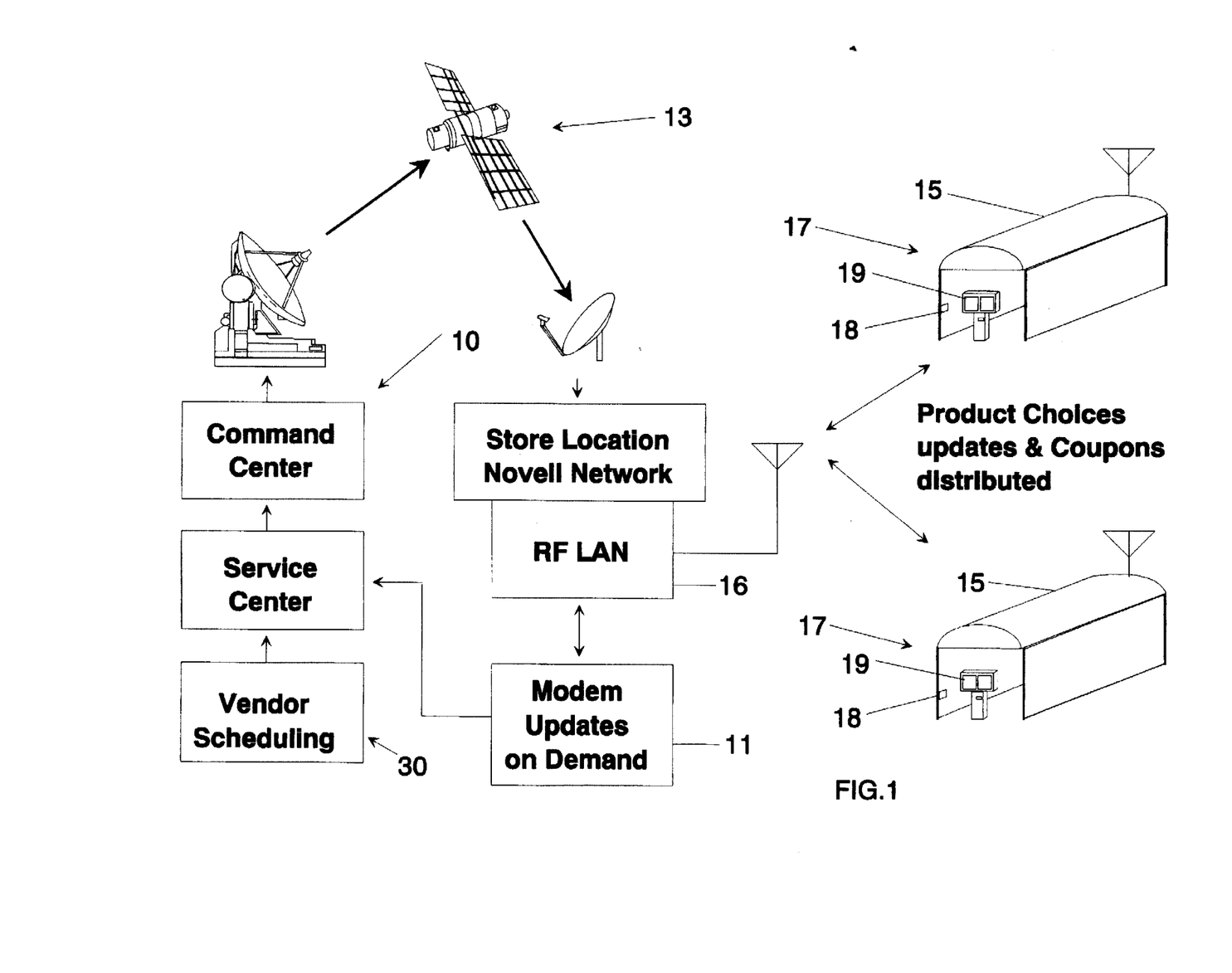
FIG. 1 is a block diagram of the system for distribution of coupons and management of shopping carts.

FIG. 1 depicts a novel system which overcomes all of the disadvantages of the existing coupon distribution and cart recovery systems of the prior art. With the system of the invention, a consumer drives to a grocery store and gets out of the car. The consumer will need a shopping basket. The customer goes to a computerized workstation kiosk 17, in the parking lot to get a shopping cart 20. At the kiosk 17, the person views an elegant Lexan, Quonset Hut cart corral 15 in which shopping carts 20 are stored. The customer enters the end of the cart corral 15, which occupies one car space. Upon entering the end of the cart corral 15, the customer views a computerized touch screen interactive video monitor 19. Displayed on the touch screen monitor 19 are approximately thirty squares. Within each square is a product logo and price of savings.

The customer at this time touches the touch screen monitor 19 with a finger to choose a product. The system printer 24 prints a coupon which feeds out approximately 6" underneath the touch screen monitor 19. The kiosk 17 computer 21 workstation then transmits via RF LAN 16 to the in-store Novell server 27. The server 27 receives the information for each transaction on the computer 21 workstation, which includes, the time, Quonset cart corral 15 number, coupon savings, coupon serial number and product the coupon was issued for. The coupons 23 will be serialized to help prevent fraudulent misuse. This information (transaction database) will be referenced below in the redemption process.

Figure 9:
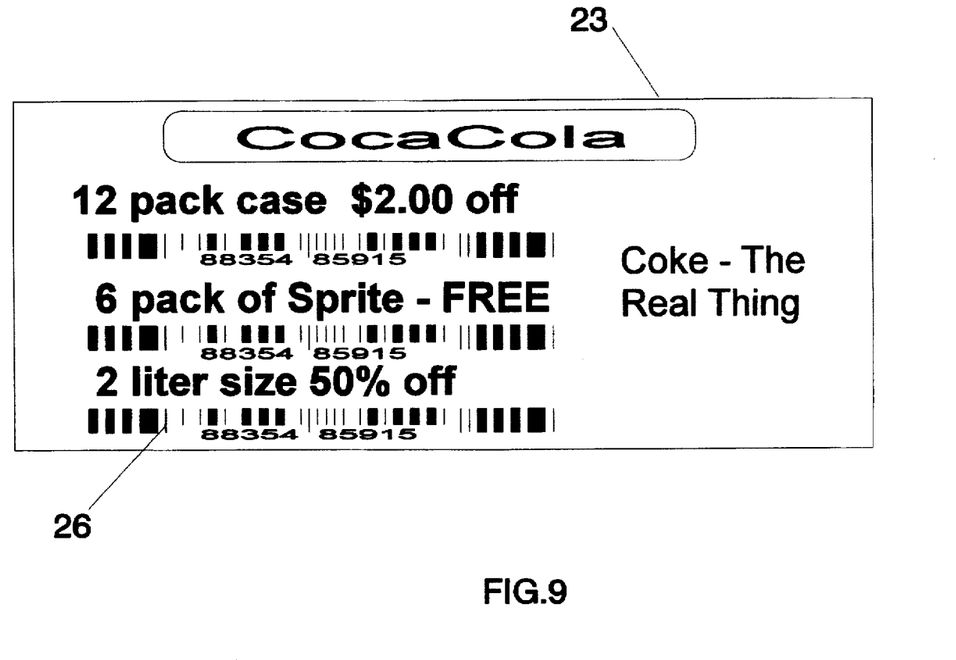
FIG. 9 is an example of a manufacturer's coupon.
Figure 10:
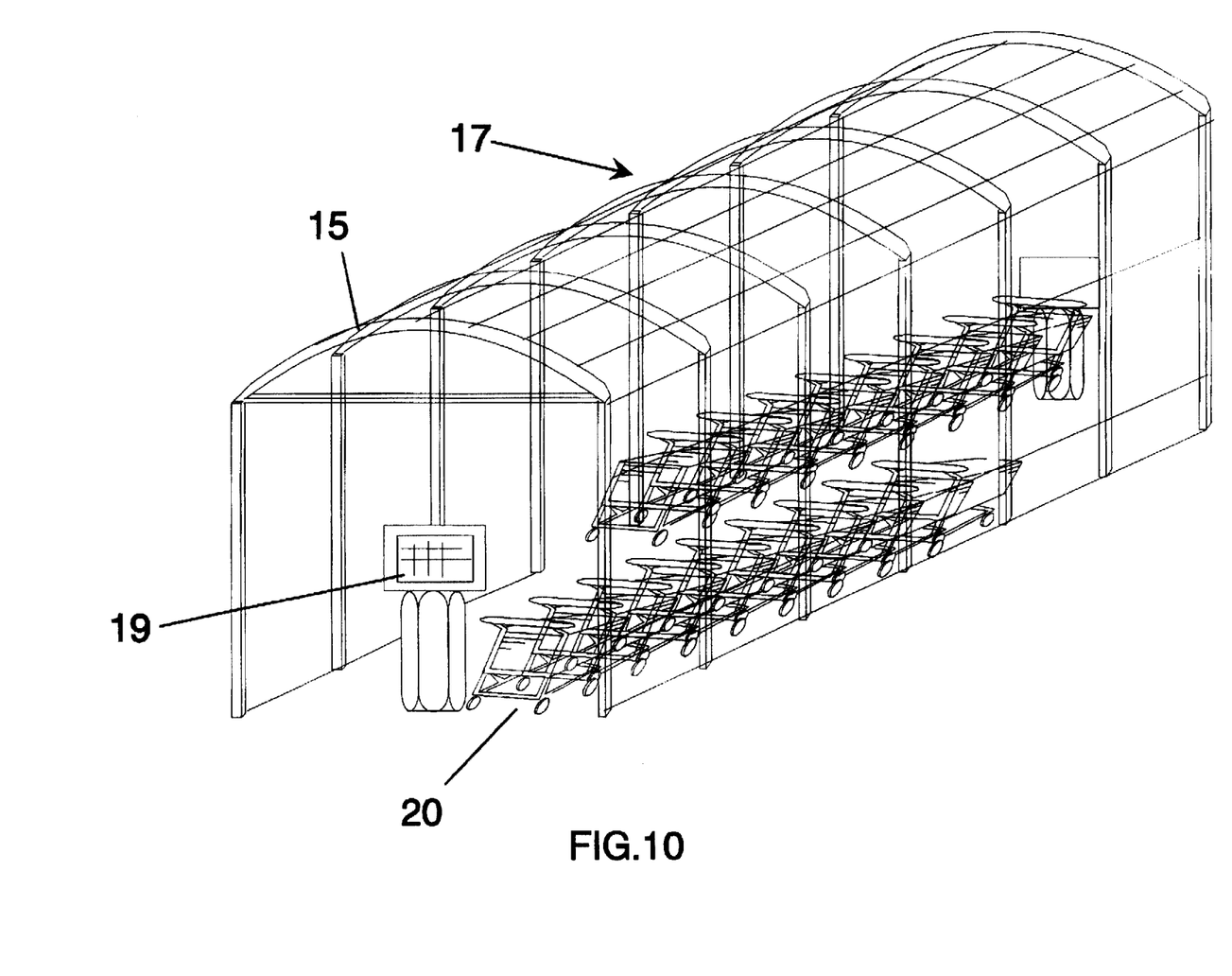
FIG. 10 is an alternative embodiment of a system workstation of the invention.

The coupons 23 will be much higher in value than newspaper and magazine coupons. The coupon 23 will display the product logo and savings amount. A shopping cart 20 is released by switch 18 and the customer takes the cart 20 and the coupon 23 to the store.

Figure 8:
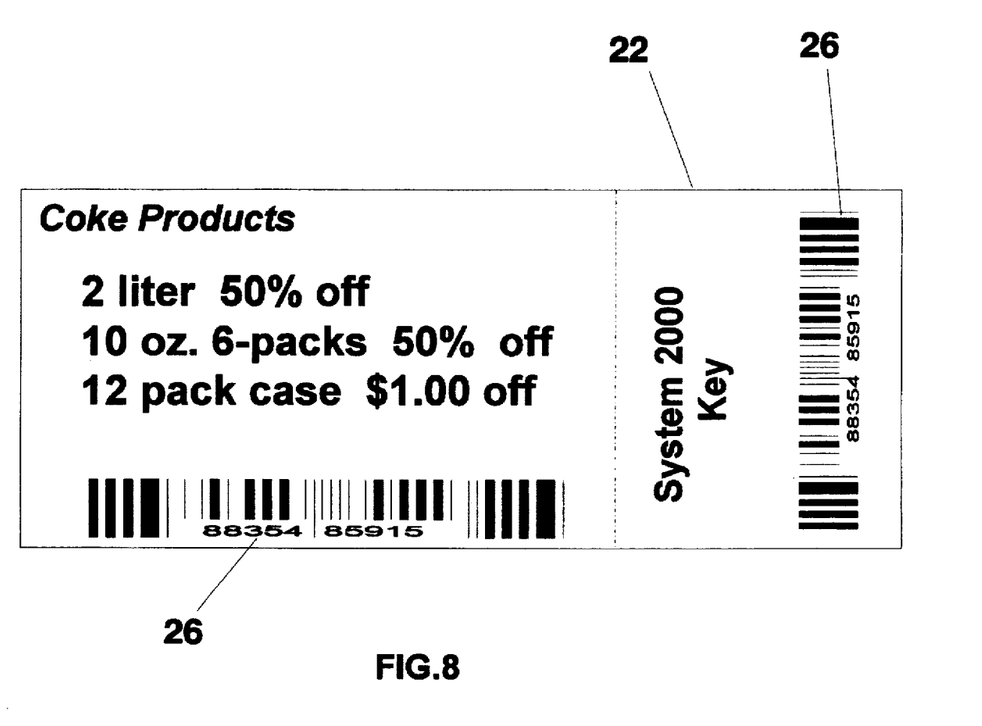
FIG. 8 is an example of a system key.

Within the store, scanners (not shown) are connected to the server 27. When the customer redeems the coupon 23 upon purchase, the cashier will scan the coupon 23 for validation. The scanned information will be sent to the server 27 where the software compares to see if this is a coupon 23 that was issued from this store by use of incremented serial number. When a valid coupon is scanned, the next step within the store is for the main computer server 27 to transmit out to all kiosks 17 in the parking lot that this coupon 23 was redeemed. An activated key 22 is now issued by the cashier so that the customer may choose a coupon 23 or a chance for instant cash when replacing the shopping cart 20. The key 22 may be a magnetic paper or plastic credit card type device in which a magnetic or other type of automatic detection strip is part of the card.

The key 22 will expire ten days after the date when it was issued. This key 22 will have embedded tracking information on the key 22. The key 22 may be used at numerous other stores which do not have kiosks 17. These stores will have solo systems, implying that it is a singular, stand alone unit which is erected within the establishment. The solo unit will operate in much the same manner, however, it will only distribute coupons. The solo unit may be equipped with moving robotics advertising display which will add to the systems notoriety.

The invention is a system which represents hundreds of manufacturers in a direct environment located in supermarket parking lots. The heart of the system is the Command and Control Center (CCC) 10 located in the home office of the service provider. The command and control center 10 is the geographic location which houses the main host computers for the entire system. The command and control center 10 is the broadcast control for the entire Wide Area Network (WAN) as far as scheduling of products displayed on the numerous touch screens at different stores through satellite transmission. The command and control center 10 also uses the public domain X.25 network for two way transmissions.

Vendors which desire to advertise products with the system of the invention, would contact the vendor scheduling/service center 30. The district representative would acquire and verify the vendor's scheduling request. The request would then be delivered to the master scheduler for final approval. The vendor would be advised by FAX of the time, locations, units and dates that their product was approved to appear on the system. Scheduling information is then sent from vendor scheduling/service center 30 to the command center 10. The command centers's primary distribution communication is by satellite 13. Secondary communications are conducted by telephone/modem. The information is first received by the Novell server 27 inside the store. The server 27 in turn distributes the information to the workstations, computers 21 located in the kiosks 17. The actions of the customer (customer receiving/redeeming coupon) interface as previously explained above takes place.

Each of the remote systems of the invention will communicate via telephone lines to the service center 30 on a scheduled, economical rate (at night). This communication would be a compressed and encrypted download of the entire distribution and redemption of those coupons at that particular location. Also included are shopping cart 20 statistics, diagnostics of computer systems, kiosk 17 lockup/open times and average temperature at that particular location.

Remote access as used in this invention, is stated as being a technical tool used by system engineers to access the host which in turn allows access to the WAN. The on-line service stated is standard communication with the independent LANs located at each store location. In re-transmitting, the command center 10 polls the store LAN servers 27 to collect the database of transaction files daily. This information is then put into a separate dedicated server at the command center 10. The manufacturers will then poll this server for their files. This allows for the manufacturer to query their files and generate reports.

In center 10 resides all of the network control facilities as well as the main database of Manufacturer's coupon information. This information will consist of the individual logo, coupon redemption price, bar code and locations to which the information is transmitted along with any coupon. The center 10 will also have statistical capabilities, and will monitor the network to provide data for upgrades, daily reports, etc.

The center 10 provides online service and repair through an X.25 network 11 (MODEM UPDATES ON DEMAND). By using an X.25 networking interconnect, a virtual direct wired connection is achieved at a fraction of the price of traditional wired networks. The service and repair on the X.25 network 11 consists of: polling of personal computer LAN servers 27 for updates on product coupons 23 issued and redeemed; alarm conditions from the PC LAN servers/workstations; and downloading from command center 10 to PC LAN servers 27 new product graphic files. By configuring the system in this way, the store may call into the main office with the in store Novell server 27, having a Central Processing Unit (CPU) 12, to communicate with the entire network from remote locations. This flexibility enables service personnel to access the system quickly.

Figure 3:
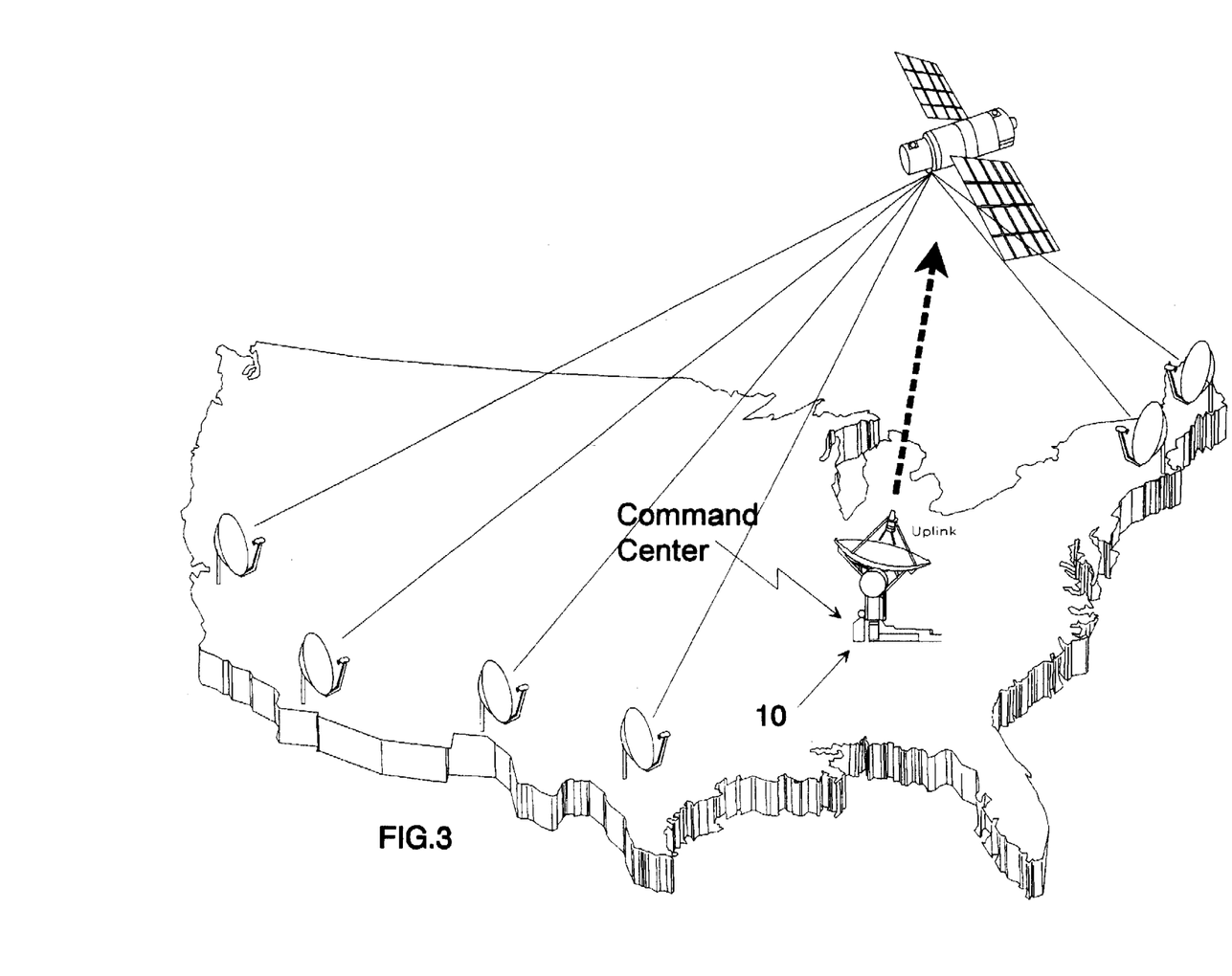
FIG. 3 is a schematic view of a data broadcasting link to stores.
Figure 4:
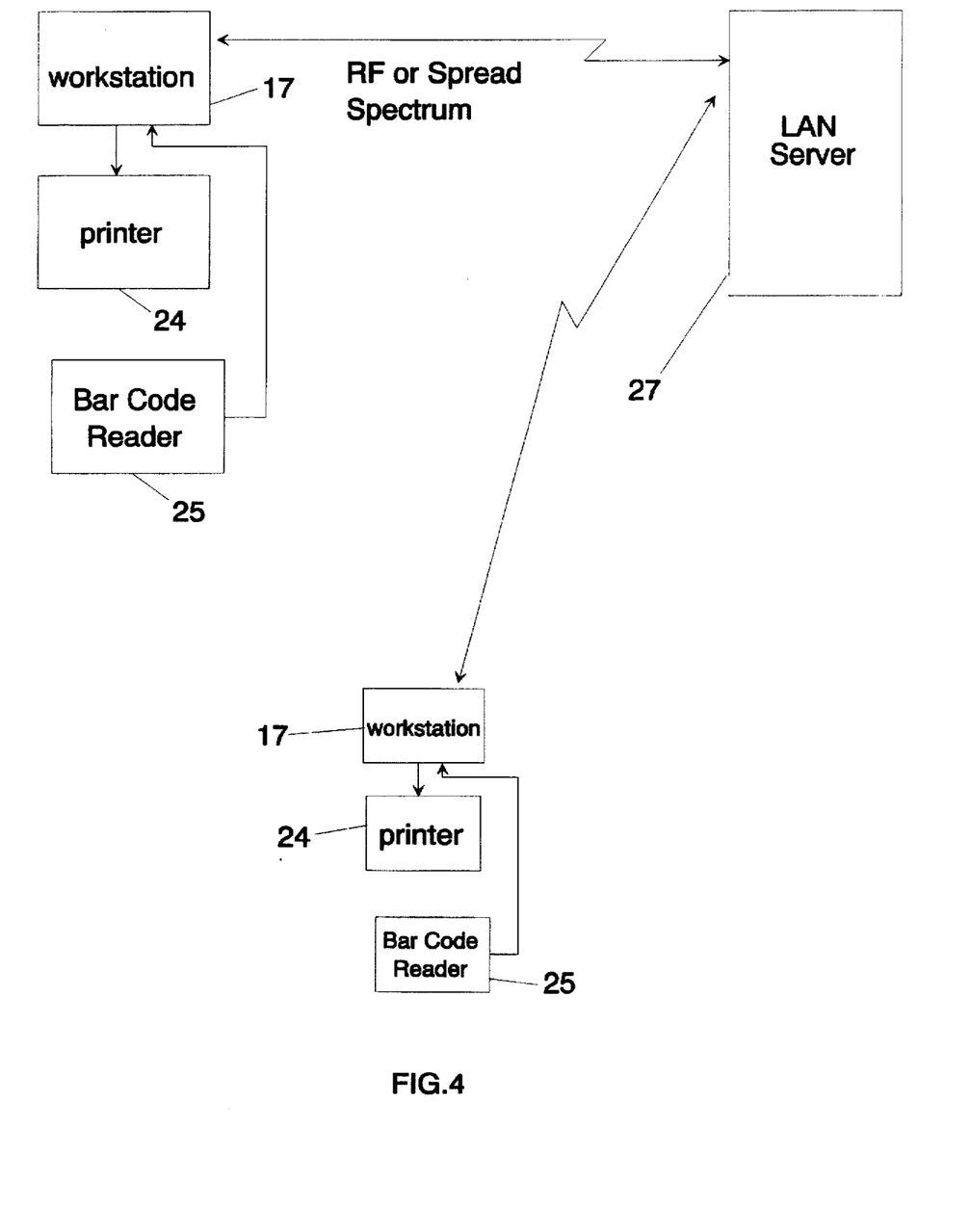
FIG. 4 is simplified flowchart of a store system.

Information is distributed to store locations via modem or optional FM squared satellite network 13. Manufacturer's logo, coupon offer, and all other relevant data is received by server 27 with a main 486 Personal Computer (CPU) 12 at each retail location. Information is distributed to individual 486, or comparable computers 21 located strategically in the parking lot, within enclosed cart corrals 15, via RF LAN 16 transmission. This results in a high resolution graphic display of the manufacturer's identifying offer on touchscreen interactive video monitors 19.

Figure 6:
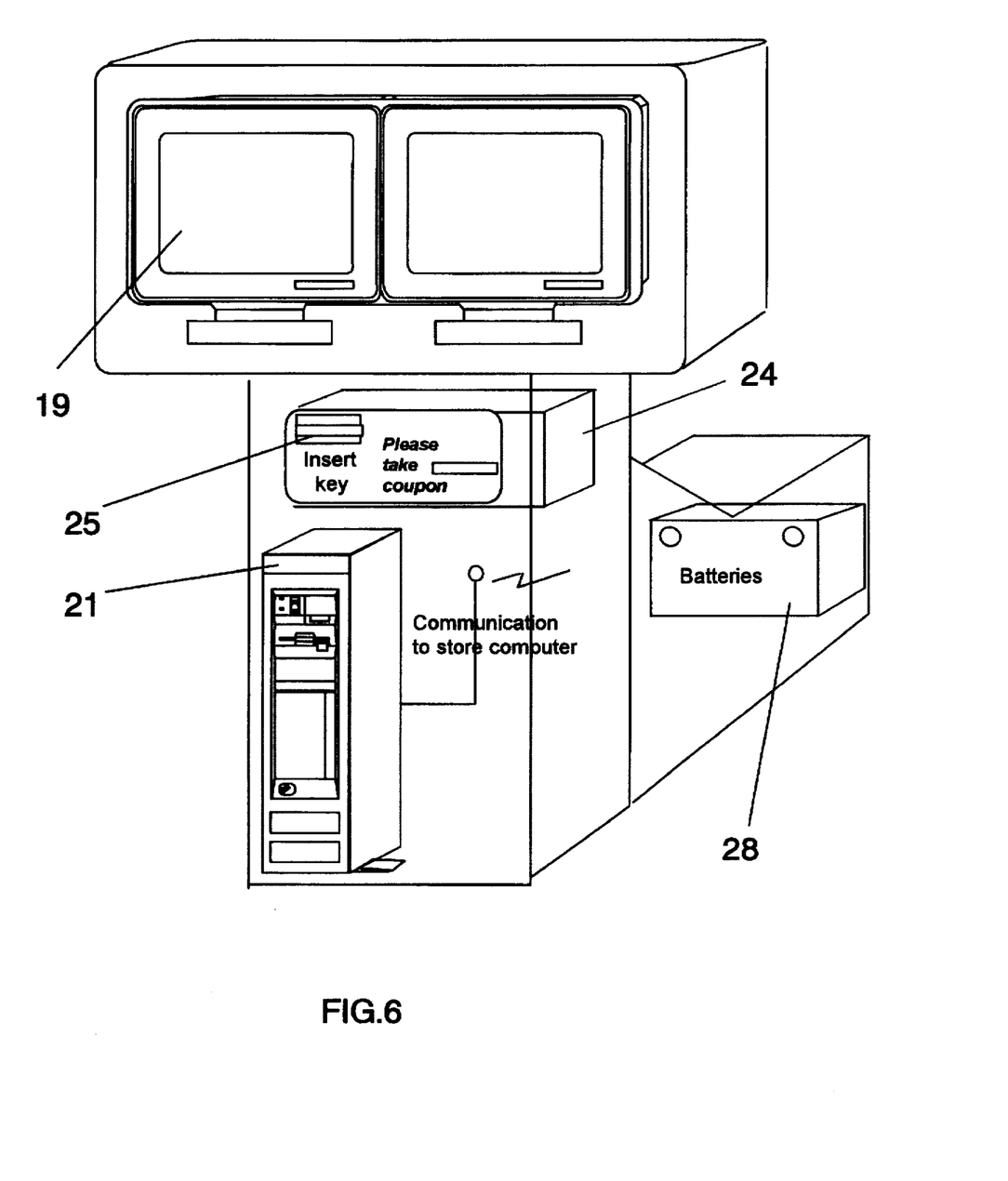
FIG. 6 is a perspective view of a kiosk computer module with two monitors.
Figure 7:
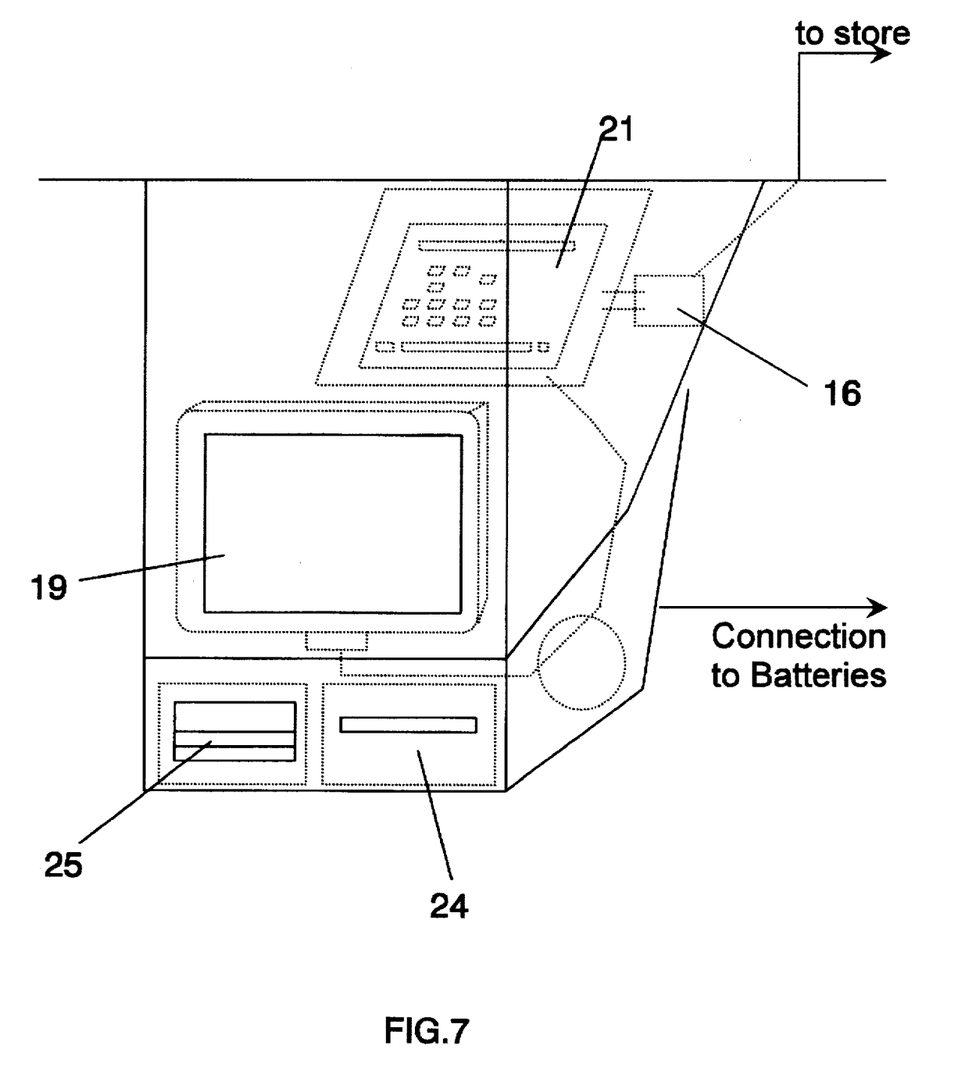
FIG. 7 is a schematic view of a system workstation.

In a preferred embodiment, the (CPU) 12 consisted of an 80486 IBM™ Compatible Personal Computer and an 80386SX IBM™ Compatible Personal Computer, the RF LAN 16 consisted of a Proxiem 250Kbps and a Motorola 10Mbps RF ETHERNET. The computerized kiosk 17 consisted of Optical Readers-Microscan Systems Inc. #MS 4200, and Keathly/Metrabyte P10-1224 bits, Touch Screen Monitor-Touch Technology 256×256 Capacitance Touch Screen, and Printer, Astro-Med LC-5000 w/QL50 Software and Internal Rewinder RW-50. An electronic beam switch 18 is located at the entrance to the corral 15 as a trigger to activate the computer in preparation for customer selection followed by issuing a key 22 and a coupon 23. The shopper tears off the key 22 when he/she returns the cart to the corral 15. To receive a coupon 23, they must insert the key 22 to activate the printer 24 to issue a coupon 23. Once the key 22 is inserted into the reader 25, and validated, and the cart 20 is returned, the coupon 23 may be selected and will be issued. The key 22, as well as the coupon 23, may then be used in the issuing store, or any other participating store.

Figure 5:
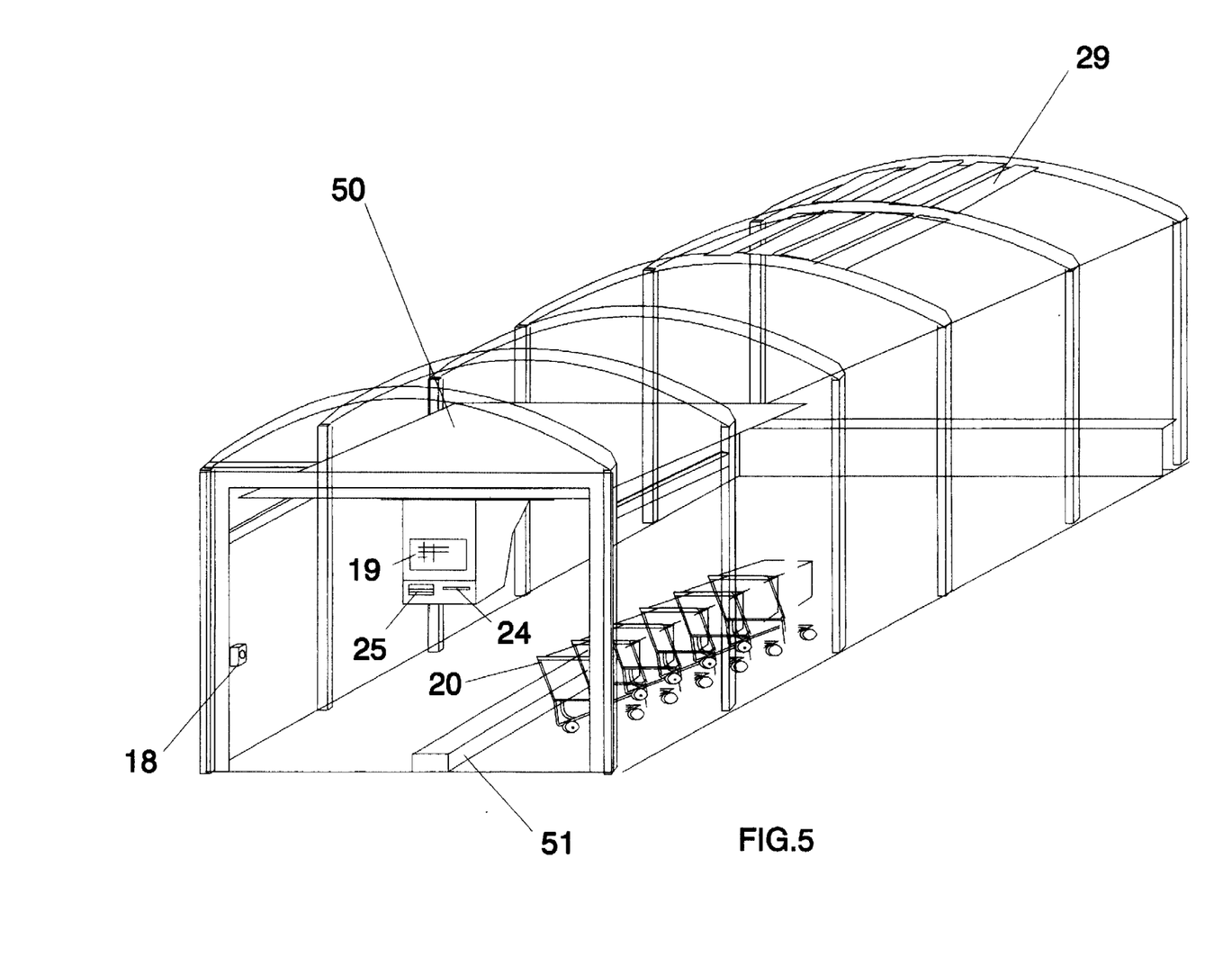
FIG. 5 is a top perspective view of a Quonset Hut corral enclosure for housing shopping carts.

FIG. 5 is a top perspective view of a Quonset Hut cart corral 15, showing solar panels 29 mounted on top to conveniently provide power for computerized kiosk 17 when power is not conveniently available. The solar panels 29 charge batteries 28 which are mounted in the center behind the touch screen monitor 19. In a preferred embodiment, solar panels 29 dimensions are 48'×13". The cart corrals 15 may also have locking enclosures in the form of doors 50 made of plexiglass on each end. These doors 50 are pulled down and padlocked after store hours by store employees. This makes for a secure outdoor enclosure controlled by the store where the system is located.

Within the cart corral 15 is a cart track 51 which guides the carts 15 which are inserted into the corral 15. This will allow for easy flow of carts 15 for customers to remove or insert while using the system of the invention.

The cart corral 15 may be fabricated out of one inch galvanized square tubing. The main structures may be welded together. The complete structure should be truck shipable and bolted together on location. The structure will also have lower securing points which will enable the corral 15 to be bolted onto the concrete by use of concrete securing bolts.

OPERATION

A computerized kiosk 17 is located at the entrance of the corral 15. During the operating hours of the retail outlet, the corral 15 is maintained in a standby status with the security doors open and the kiosk 17 in operation. Customers take their shopping carts 20 and the issued coupon 23 and key 22 from the corral and proceed to make their purchases.

Figure 2:
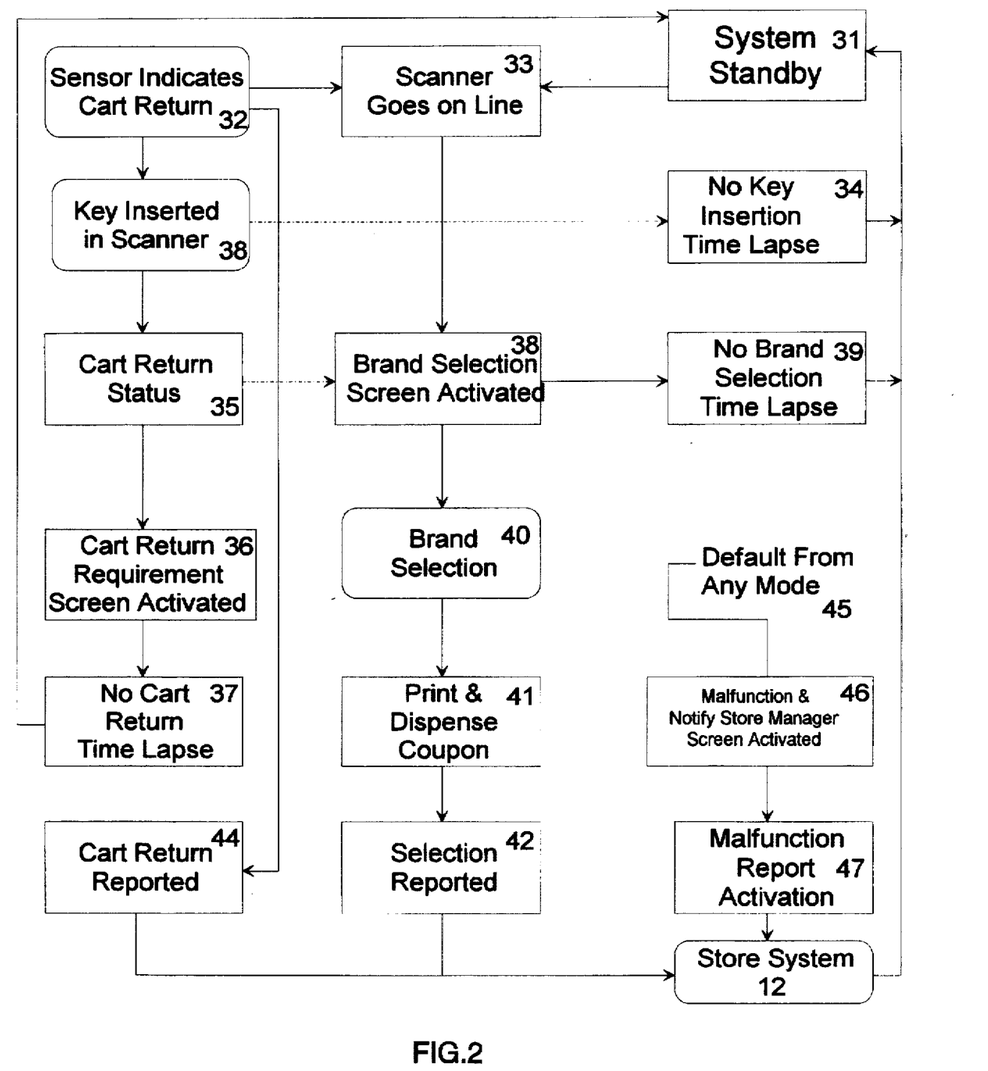
FIG. 2 is a simplified flow chart showing the functions performed during the operation of the method in accordance with the invention.

When the customer has unloaded the purchases at the vehicle, he returns to the corral 15 in which the kiosk 17 is at a standby status (SYSTEM STANDBY) 31 (See FIG. 2). The return of the shopping cart 20 (SENSOR INDICATES CART RETURN) 32 causes the activation of the computer 21 and the software directs the activation of the dispenser located in the kiosk 17 (SCANNER GOES ON LINE) 33. The software further directs the activation of a time interval wherein the insertion of the key 22 is expected in the dispenser. If the interval expires without the insertion of a key 22 (NO KEY INSERTION TIME LAPSE) 34, the kiosk 17 is returned to a standby status (SYSTEM STANDBY) 31. Upon the insertion of a key 22, the software directs the determination of the return of a shopping cart 20 (CART RETURN STATUS) 35. If a cart 20 has not been returned, the software directs the activation of a touchscreen interactive video monitor screen 19 in the kiosk 17 that indicates the necessity to return a cart 20 in order to receive the discount coupons 23 (CART RETURN REQUIREMENT SCREEN ACTIVATED) 36. The software also directs the activation of a time interval for the return of a shopping cart 20 (NO CART RETURN TIME LAPSE) 37. If a cart 20 is not returned by the expiration of the time interval the kiosk 17 is returned to a standby status (SYSTEM STANDBY) 31. If there has been the return of a shopping cart 20, the software directs the activation of the selection screen 19 (BRAND SELECTION) 40 for the choosing of the desired discount coupon 23 (BRAND SELECTION SCREEN ACTIVATED) 43. The software also directs the activation of a time interval for the selection of a product coupon 23 (NO BRAND SELECTION TIME LAPSE) 39. If the time interval expires without the selection of a product coupon 23, the kiosk is returned to a standby status (SYSTEM STANDBY) 31. Upon a selection being made by the action of the customer touching the product screen on the monitor 19, the software directs the printing and dispensing of the appropriate discount coupon 23 (PRINT & DISPENSE COUPON/S) 41. The selection is then added to the tabulation of selected coupons 23 and is transmitted to the store central processing unit 12 (SELECTION REPORTED) 42. Upon completion of the report, and an acknowledgment from the store system CPU 12, the kiosk 17 is returned to a standby status (SYSTEM STANDBY) 31.

A default mode (DEFAULT FROM ANY MODE) 45 is included in the system that allows the activation of a malfunction screen (MALFUNCTION & NOTIFY STORE MANAGER SCREEN ACTIVATED) 46 and the transmittal of a malfunction report (MALFUNCTION REPORT ACTIVATION) 47 if the system computer and software is functional but other problems have been encountered by the system. The store CPU system 12 includes malfunction notification if communication between the kiosk 17 and the store is disrupted. The software also includes appropriate notification to the store system in the event of low printing media supply or the occurrence of other normal maintenance intervals.

The method of the invention works in the following manner. There are two alternatives possible. The Consumers may activate the kiosk 17 by withdrawing a cart 20 and making a selection, or by returning a cart 20, and inserting the bar coded key 22. This coupon 23 is produced with the manufacturer's discount coupon price or offer, encoded information for marketing purposes and coupon disclaimers. Public service or manufacturer messages can also be programmed to appear on the coupon 23. The coupon 23 can be tailored demographically to give the manufacturer and retailer the greatest movement of product through the chain.

All statistical information regarding coupon use and redemption will be updated through the X.25 network 11 to the command and control center 10. This information will be provided to the store and manufacturers so they can track the use and effectiveness of products, special pricing etc., for different areas, different stores, etc. This is done automatically through the integration of UPC-standard bar codes. Where retailers use checkout scanner equipment, redeemed coupons can be read into the checkout computer and information recovered for analysis. This data can be integrated into the previously mentioned data to provide detailed demographic data to each store and manufacturer.

Figure 11:
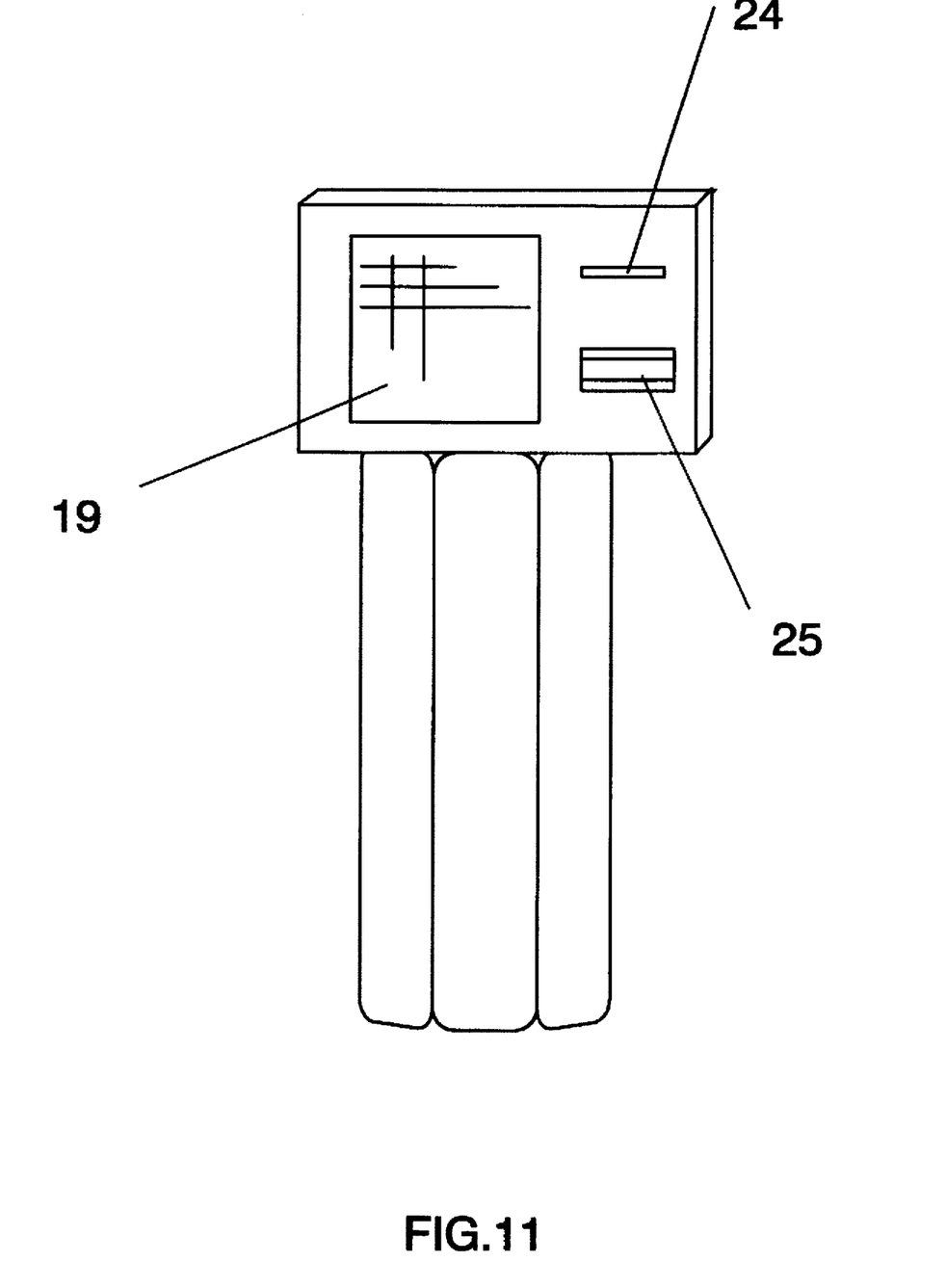
FIG. 11 is a front perspective view of a solo unit in accordance with the invention.

The system of the invention may be expanded to include the ability of the activator key 22 to be recognized and read by other dispensing machines, as shown in FIG. 11, in "non-shopping cart" locations, giving consumers access to a wider range of value around town. This key 22 is taken to the named store where it can be inserted into a reader 25 which will "recognize" the key 22 as having been used by a "cart returner" and allow the consumer to select a coupon from among the specials for that day.

For most retail operations, the system of the invention will pay for itself immediately from the combined savings in the area of labor, shrinkage, and liability, which does not even consider newly created revenues from floor space displays and inventory turns generated in space that had formerly been given over to in-store cart storage. Some non-monetary benefits of the system of the invention will be the entertainment value of interactive coupon selection, clean parking spaces and fewer cart-to-car encounters, providing goodwill amongst shoppers, and providing a more pleasant shopping experience.

It will be appreciated that, although a specific embodiment of the invention has been described in detail for purposes of illustration, various modifications may be made without departing from the spirit and scope of the invention. Accordingly, the invention is not to be limited except as by the appended claims.

We claim:

1. A system for printing and issuing a redeemable coupon in a cart storage area, in response to the return of a cart to storage or taking of a cart from storage, the system comprising:

a command and service center having a personal computer based LAN for providing on-line service and repair through an X.25 network control facility as well as for storing and disseminating a database of manufacturer's coupon information, said database including computer and software means for collecting, storing and disseminating individual logo, coupon redemption price, bar code and locations to which said information is transmitted, networking means operatively connected to said command center for communicating between said command center and a plurality of remote central processing means for re-transmitting manufacturer's coupon information, remote central processing means, operatively connected to said networking means, for receiving and re-transmitting manufacturer's coupon information, said remote central processing means including computer and software means, a modem, and an RF LAN network, a plurality of cart corrals for storing shopping carts, a kiosk located in each of said corrals for receiving and processing said coupon information, said kiosks including computer and software means operatively connected to said remote central processing means, and having switch means for sensing the selection of a cart and the return of a cart to storage, an optical reader for reading a bar coded, paper key, a touch screen video monitor for selecting a coupon, a power supply battery, and coupon printing and issuing means for receiving and displaying manufacturer's identifying coupon information and issuing coupons in response to taking of carts from storage or return of said carts to storage.

2. The system as set forth in claim 1, said kiosk computer and software means having an operating system for responding to a cart sensing signal, switching said kiosk computer and software means, and a selection screen to active status or inactive status, issuing a selected coupon, and switching said kiosk computer means and selection screen to standby after a time lapse.

3. A system for printing and issuing a redeemable coupon in a cart storage area, in response to the taking of a cart or the return of a cart to storage, the system comprising:

a command and service center for providing network control facilities as well as for storing and disseminating a main data base of manufacturer's coupon information, networking means for communicating between said command and service center and a plurality of remote central processing terminals for transmitting and receiving manufacturer's coupon information, said networking means consisting of an X.25 network for providing updates on demand, remote central processing means including, IBM compatible computers, a modem, and an RF LAN network for receiving and re-transmitting manufacturer's coupon information transmitted by said networking means, and a plurality of cart corrals for storing shopping carts, a plurality of shopping carts, a kiosk located in each of said cart corrals, each of said kiosks consisting of a receiving means for receiving manufacturer's coupon information from said remote central processing means, a computer and software means for providing an operating system for said kiosks, switch means for sensing the selection of a cart and the return of a cart to storage, an optical reader for reading a bar coded, paper key, a touch screen monitor for selecting a coupon, and a printer for issuing a coupon in response to a return of a cart to storage.

4. A system for printing and issuing a redeemable coupon in a cart storage area, in response to the return of a cart to storage or taking a cart from storage, the system comprising:

a command and service center having a personal computer based LAN for providing on-line service through an X.25 network control facility as well as for storing and disseminating a database of manufacturer's coupon information, said data base including computer and software means for collecting, storing, and disseminating individual logo, coupon redemption price, bar code and locations to which said information is transmitted, networking means for communicating between said command and service center and a plurality of remote central processing terminals for transmitting and receiving manufacturer's coupon information, said networking means comprising an X.25 network for providing updates on demand, remote central processing means located within a network of retail stores, said central processing means including IBM compatible computers, a modem, and an RF LAN network for receiving manufacturer's coupon information transmitted by said networking means and re-transmitting said coupon information to a plurality of kiosks located in corrals on the parking lots of said retail stores, and at least one covered cart storage corral, including at least one kiosk having switch means for sensing the taking or the return of a cart to storage, a computer and software operatively connected to said switch means, and having communications means for receiving and processing manufacturer's coupon information and kiosk operating status, an optical reader for reading a bar coded paper key operatively connected to said computer, a touch screen video monitor for selecting a manufacturer's coupon operatively connected to said computer, and a printer for issuing a coupon in response to taking or the return of said carts to storage in said corral.

5. In a kiosk system for printing and issuing manufacturer's coupons in response to the taking of or the return of a shopping cart, a computer implemented process comprising the steps of:

starting a computer and switching said computer to a standby condition, detecting the return of a cart to storage, and switching said computer to an active condition in preparation for customer selection of a coupon, switching a ticket dispenser to an active condition by said computer in preparation for customer selection of a coupon, starting a time interval wherein the insertion of a bar coded, paper key is expected in said dispenser, reading a bar coded, paper key for validating and authorizing coupon dispensing, starting a coupon selection, interactive, touch screen video monitor, for displaying and selecting available manufacturer's coupons, starting a time interval for selection of a product coupon, and returning said computer to standby after time lapse, selecting a manufacturer's brand on said video monitor screen, and communicating a selection to said computer, communicating said ticket selection from said computer to said ticket dispenser and issuing a selected coupon, tabulating selected coupons by said computer and transmitting information to a store system, and switching said computer and the kiosk system to standby condition.

6. The process as set forth in claim 5, including the steps of:

returning said computer to standby condition after expiration of said time interval for insertion of a bar coded paper key, returning said kiosk system to a standby condition at expiration of said period for product coupon selection, and transmitting malfunction reports, low media supply, or occurrence of other maintenance intervals to the store system.

* * * * *